United States Patent [19]

Sain

[11] Patent Number: 4,633,767

[45] Date of Patent: Jan. 6, 1987

[54] MODULAR VENTILATION SYSTEM FOR VEHICLES

[75] Inventor: Bernard S. Sain, Old Bridge, N.J.

[73] Assignee: Trailer Marine Transport Corporation, San Francisco, Calif.

[21] Appl. No.: 761,825

[22] Filed: Aug. 2, 1985

[51] Int. Cl.⁴ ............................................. B60L 1/00
[52] U.S. Cl. ...................................... 98/6; 62/235.1; 62/239; 136/291; 180/65.3
[58] Field of Search ................... 62/235.1, 239; 98/6; 180/65.3; 136/291

[56] References Cited

U.S. PATENT DOCUMENTS

| | | | |
|---|---|---|---|
| 3,421,340 | 1/1969 | Von Berg | 62/239 |
| 3,943,726 | 3/1976 | Miller | 62/235.1 |
| 4,181,188 | 1/1980 | Dessert | 180/65.3 |
| 4,307,575 | 12/1981 | Popinski | 62/239 |
| 4,327,316 | 4/1982 | Fujikubo et al. | 180/65.3 |

Primary Examiner—Ronald C. Capossela
Attorney, Agent, or Firm—Ernest M. Anderson

[57] ABSTRACT

A modular ventilation system powered by solar energy is disclosed for installation in trailers or other vehicles that have large storage compartments. The system essentially comprises a sectionalized cabinet that contains and supports fan motors, solar batteries, a voltage regulator and microprocessor; an air plenum having a lower air intake and an upper opening adapted for fluid connection with those sections of the cabinet that house fan motors; and a solar panel array that mounts in the horizontal top panel or roof of a trailer-vehicle.

14 Claims, 4 Drawing Figures

MODULAR VENTILATION SYSTEM FOR VEHICLES

This invention relates generally to ventilation systems for vehicles and more particularly to a solar powered ventilation system. The use of solar energy to power fan motors is known and has been used previously in connection with automobiles and other passenger vehicles, such as shown and described in U.S. Pat. Nos. 3,943,726; 4,181,188; and 4,327,316. This invention, however, is directed to a modular ventilation system that may be installed and used in trailers that transport goods which may be susceptible to heat or moisture damage during transit. Such a system must not only generate substantial electrical power, it must also operate under various climatic conditions, be useful on trailers of different sizes and be adjustable for use in transporting different kinds of products.

More specifically, this invention provides a modular ventilation system that may be installed in trailers and which essentially comprises three units; a sectionalized cabinet that contains and supports at least one fan motor, at least one solar battery and a voltage regulator; an air plenum having a lower air intake and an upper opening adapted for fluid connection with those sections of the cabinet that house fan motors; and a solar panel array that mounts in the horizontal top panel of a trailer.

A principal object of this invention is to provide a modular ventilation system that is economical to install in trailers or other vehicles having a large storage space and which is useful for different sizes of vehicles.

Another object is to provide a modular ventilation system of the kind described and having a sectionalized cabinet that mounts to the front panel or wall of a trailer and which supports fan motors, solar batteries and a voltage regulator.

A further object is to provide a modular ventilation system of the kind described including an air plenum or conduit that mounts to the outside of the front wall of the trailer, said plenum having an air intake located a substantial distance below the top of the vehicle to prevent the intake of exhaust fumes or other gases which may pass over the top of the trailer.

A still further object of the invention is to provide a modular ventilation system for vehicles that provides a controlled airflow, taking air into the storage compartment through an intake in front of the vehicle and below the top thereof and venting air from the storage compartment through air vents in the rear and side wall panels of the vehicle.

Other objects of this invention will become apparent in view of the drawings and the following detailed description.

DESCRIPTION OF THE DRAWINGS

In the drawings forming part of this application and in which like parts and components are indicated by like reference numbers:

Referring to FIGS. 1 and 2, a modular ventilation system is provided for the storage compartment of a trailer-vehicle 10 having a bed 10a, a front panel 10b, side panels 10c, a rear panel 10d and a top panel 10e. The system comprises a sectionalized cabinet 11 that mounts to the front wall or panel of trailer 10 and supports a pair of fan motors 12, a pair of solar batteries 13, a voltage regulator 14 and a microprocessor 15. Fan motors 12 are located in horizontally spaced sections of cabinet 11 and each motor is guarded by a heavy duty screen 11a. Solar batteries 13, voltage regulator 14 and microprocessor 15 are housed in a third section of the cabinet between sections which house the fan motors, said section being enclosed by side walls and a front panel 11b.

Figure 1:
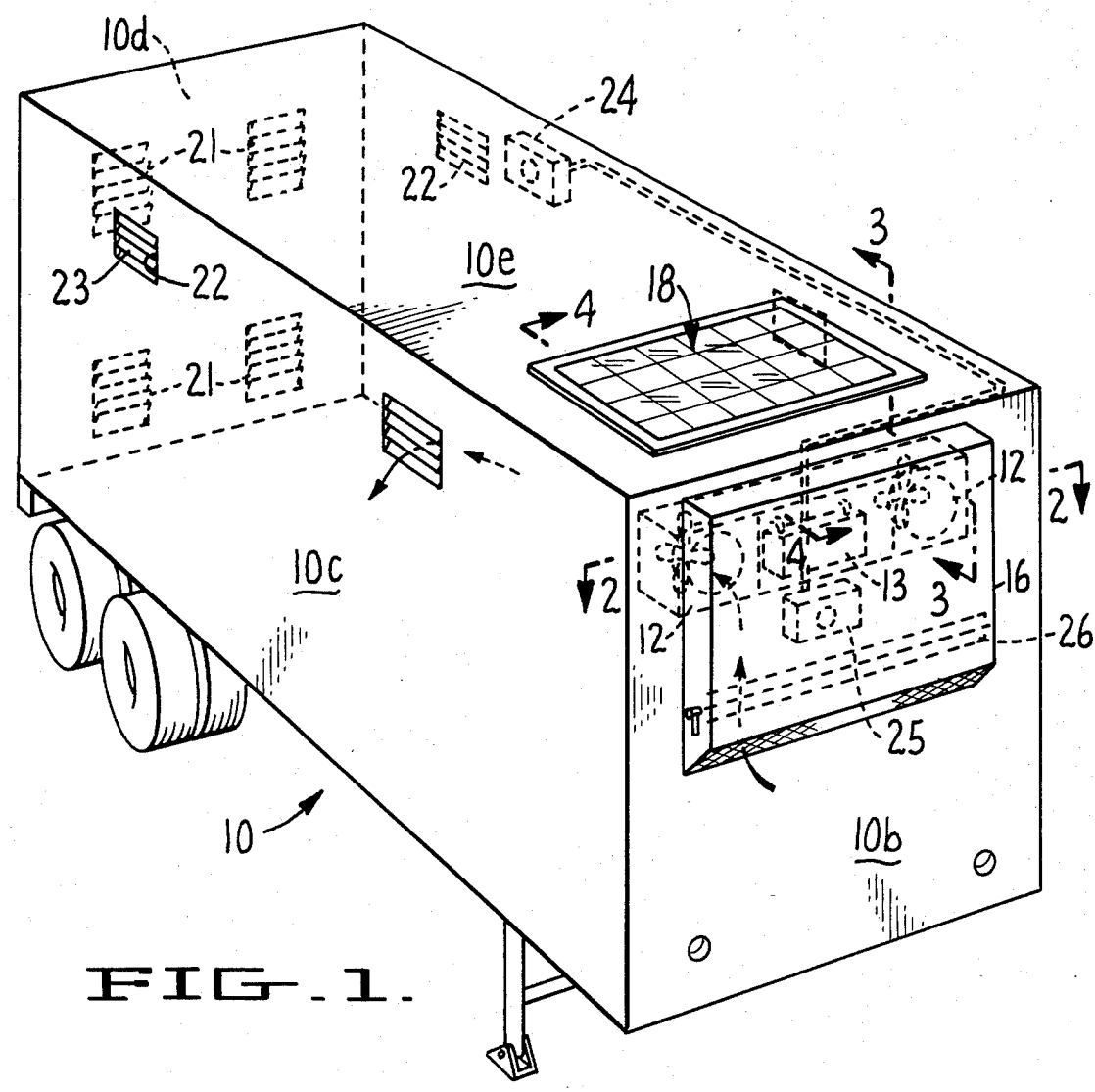
FIG. 1 is a perspective view of a trailer equipped with a preferred embodiment of the invention in a solar powered ventilation system.
Figure 2:
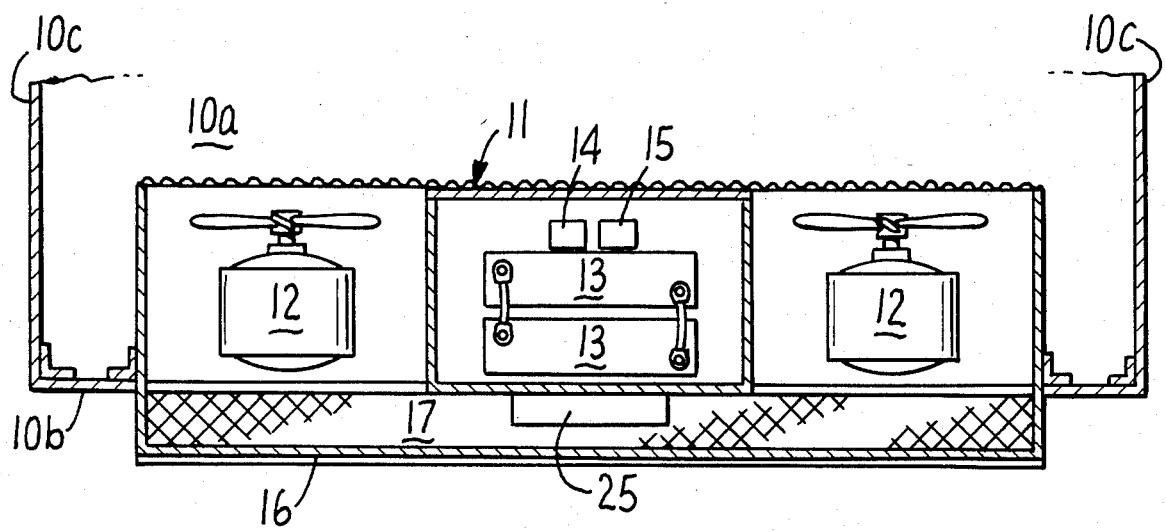
FIG. 2 is a horizontal transverse section taken on the lines 2—2 of FIG. 1.
Figure 3:
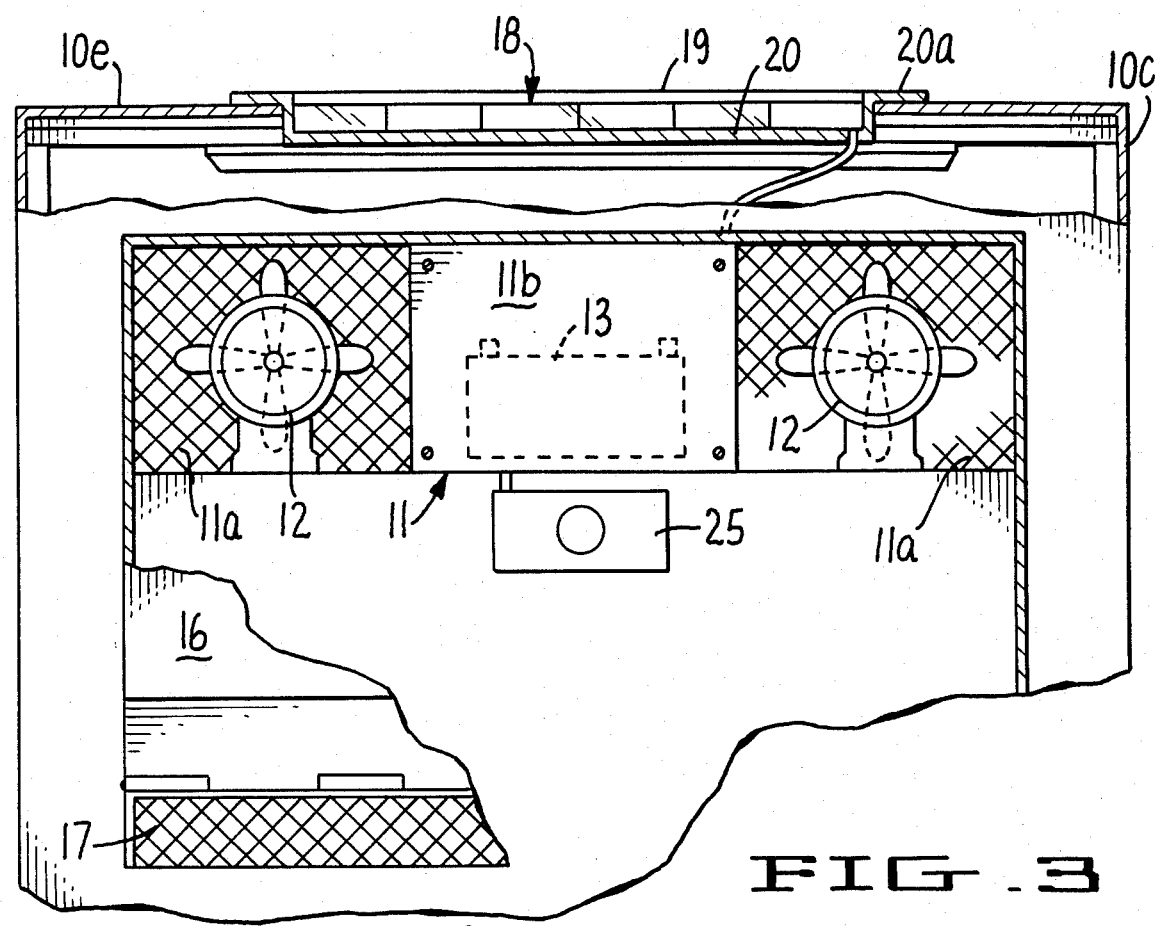
FIG. 3 is a vertical transverse section taken on the broken lines 3—3 of FIG. 1.
Figure 4:
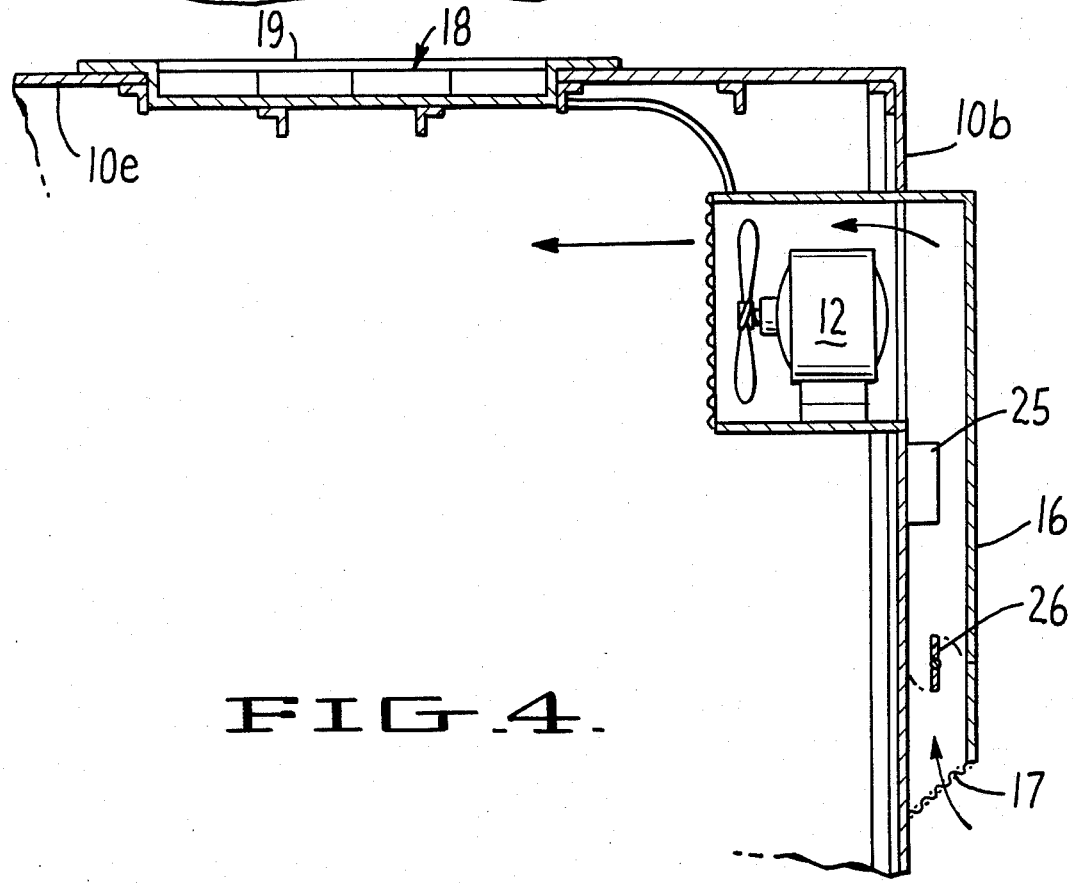
FIG. 4 is a vertical longitudinal section taken on the lines 4—4 of FIG. 1.

An air plenum 16 mounts to the outside of front panel 10b of the vehicle, said plenum having a lower air intake guarded by a screen 17 and a pair of upper openings that connect with the two sections of the cabinet 11 which house fan motors 12. It is to be noted, FIG. 4, that the intake is located a substantial distance below the top of the vehicle to prevent the intake of exhaust fumes or other gases passing over the top of the trailer.

A third essential component of the ventilation system comprises a unitary solar panel array 18 that mounts in the horizontal top panel of the trailer. Solar panel 18 is covered by a transparent protective panel 19 and is supported in a tray 20 having a peripheral rim 20a that rests upon the top panel 10e of the vehicle. Tray 20 supports the solar panel array in the space directly below the top of the trailer. This support construction is particularly advantageous since it allows the solar panel array and tray to be expeditiously mounted as a unit. In addition, there are no solar panels that project above top panel 10e as would increase both the height clearance of the vehicle and the wind resistance.

Means is also provided for venting air from the storage compartment of the trailer. For this purpose a set of four vent openings 21 are formed in rear panel 10d of the trailer. Other vent openings 22 are formed in each side panel 10c. In preferred applications the vent openings formed in the rear panel include openings that are located slightly below openings 22 formed in the side panels, and all of the openings are guarded by adjustable louvers 23. With this arrangement the airflow may be closely controlled and adjusted to the loading of the vehicle, to the particular environmental conditions which are encountered, or to the desired amount of ventilation required by the particular product being stored.

Fan motors 12 are controlled by a pair of thermostat and humidistat monitors 24 and 25 which sense the dew point levels inside the storage compartment and outside the vehicle. The two control units function together and with the microprocessor to either allow the fans to operate, or cease operation, depending on the value of moisture levels inside and outside. The inclusion of these controls and sensors ensures that the product being transported or stored will not be subjected to extreme conditions that produce either unwanted drying or dampening of the product. The microprocessor may also be programmed to provide a "cycle-time" for recharging the batteries during non-operating time intervals.

The ventilation system illustrated further includes a pivotally mounted flapper plate 26 that extends across the air intake plenum 1b. Plate 26 is located at the lower end of the plenum and may be pivoted to either an open or closed position, the open position being illustrated in FIG. 4. The plate is pivoted to a closed position (as are each of the exhaust vents) for purposes of fumigating certain products such as cocoa, beans and tobacco. Once fumigation is completed plate 26 is pivoted into its open position and the louvers 23 are properly adjusted.

The modular design of the ventilation system allows all controls to be prewired to their operational components. The only electrical connection required for installation is that made between solar panel array 18 and solar batteries 13.

Although a preferred embodiment of the invention has been illustrated and described, various modifications and changes may be resorted to without departing from the spirit of the invention or the scope of the appended claims, and each of such modifications and changes is contemplated.

What is claimed is:

1. A modular ventilation system for installation and use in conjunction with transporting goods susceptible to heat or moisture damage during transit, and comprising:
   (a) a horizontally sectionalized cabinet containing and supporting at least one fan motor, at least one solar battery and a voltage regulator;
   (b) an air plenum having a lower air intake and an upper opening adapted for fluid connection with sections of said cabinet which house each fan motor; and
   (c) a solar panel array adapted for mounting in the horizontal top panel of a storage compartment.

2. The modular ventilation system of claim 1, said cabinet containing and supporting a pair of fan motors spaced horizontally apart, said solar battery and voltage regulator being located intermediate said pair of fan motors.

3. The modular ventilation system of claim 1, said cabinet being divided into three sections, one section being horizontally intermediate the other two sections, said one section containing said solar battery and voltage regulator, each of said other two sections housing a fan motor and having an opening for fluid communication with the upper opening of said air plenum.

4. The modular ventilation system of claim 1, and a tray for supporting said solar panel array in the top panel of a storage compartment, said tray having a peripheral upper rim for supporting said panel array within a space directly below the upper plane of the top panel.

5. The modular ventilation system of claim 1, and a transparent protective panel overlying said solar panel array.

6. A wheeled vehicle or trailer for transporting goods susceptible to heat or moisture damage during transit and having an elongated storage compartment defined by a bed and front, side, rear and top panels; a sectionalized cabinet mounted to said front panel within said storage compartment; at least one fan motor mounted within one section of said cabinet; an air plenum mounted to the exterior surface of said front panel and having a lower air intake and an upper opening in fluid communication with said one section of said cabinet; and a solar panel array horizontally mounted in said top panel.

7. The wheeled vehicle or trailer of claim 6, louvered openings being formed in said rear panel for venting air from said storage compartment.

8. The wheeled vehicle or trailer of claim 7, louvered openings being formed in said side panels for venting air from said storage compartment.

9. The wheeled vehicle or trailer of claim 7 or 8, said louvered openings being adjustable to regulate airflow.

10. The wheeled vehicle or trailer of claim 8 or 9, the openings formed in said rear panel being below openings formed in said side panels.

11. The wheeled vehicle or trailer of claim 6, the lower air intake of said air plenum being located a substantial distance below the top panel of said vehicle to prevent the intake of exhaust fumes or other gases passing over the vehicle.

12. The wheeled vehicle or trailer of claim 6, and a tray supporting said solar panel array within a space directly below the upper plane of the top panel.

13. The wheeled vehicle or trailer of claim 6, and further comprising means for controlling fan motor operation including a thermostat and a pair of humidistat monitors for sensing dew point levels inside the storage compartment and ambient conditions outside said vehicle.

14. The wheeled vehicle or trailer of claim 6, said cabinet being divided into three sections, one section being horizontally intermediate the other two sections, said one section containing said solar battery and voltage regulator, each of said other two sections housing a fan motor and having an opening for fluid communication with the upper opening of said air plenum.

* * * * *